United States Patent [19]

Horii

[11] Patent Number: 4,721,002

[45] Date of Patent: Jan. 26, 1988

[54] CLUTCH TYPE CHANGE SPEED APPARATUS FOR WORKING VEHICLE

[75] Inventor: Yasuyuki Horii, Sakai, Japan

[73] Assignee: Kubota, Ltd., Osaka, Japan

[21] Appl. No.: 797,544

[22] Filed: Nov. 13, 1985

[30] Foreign Application Priority Data

May 25, 1985 [JP] Japan ................................ 60-112845
May 29, 1985 [JP] Japan ................................ 60-116162

[51] Int. Cl.⁴ ............................................. F16H 3/08
[52] U.S. Cl. ...................................... 74/329; 74/360
[58] Field of Search ................ 74/329, 335, 358, 359, 74/360

[56] References Cited

U.S. PATENT DOCUMENTS

| 2,506,671 | 5/1950 | Jacobi ................................ 74/360 X |
| 4,023,418 | 5/1977 | Zenker ............................... 74/360 X |
| 4,090,414 | 5/1978 | White ................................ 74/335 X |
| 4,106,364 | 8/1978 | Zenker et al. ..................... 74/360 X |
| 4,136,575 | 1/1979 | Labat ................................ 74/360 X |
| 4,261,217 | 4/1981 | Arai et al. ............................ 74/360 |

FOREIGN PATENT DOCUMENTS

| 608762 | 8/1926 | France ................................ 74/360 |
| 51052 | 3/1982 | Japan ................................. 74/360 |
| 61-62647 | 3/1986 | Japan . |
| 2036208 | 6/1980 | United Kingdom . |

Primary Examiner—Leslie Braum
Assistant Examiner—Dwight G. Diehl
Attorney, Agent, or Firm—Edwin E. Greigg

[57] ABSTRACT

A clutch type change speed apparatus for a working vehicle comprising a first transmission shaft (3) acting as an input shaft, a second transmission shaft (4), a second clutch (8) operatively interconnecting the first transmission shaft (4) and the second transmission shaft (8), a third transmission shaft (6), a fourth transmission shaft (7) acting as an output shaft, a third clutch (9) operatively interconnecting the third shaft (6) and the fourth transmission shaft (7), a first gear mechanism (10) provided between the first transmission shaft (3) and the third transmission shaft (6), a second gear mechanism (11) provided between the second transmission shaft (4) and the third transmission shaft (6), a third gear mechanism (12) provided between the second transmission shaft (4) and the fourth transmission shaft (7), the first to third gear mechanisms (10-12) being the constant mesh type and having different reduction ratios, a first clutch (13) adapted to switch a freely rotatable gear (G1) of the first gear mechanism (10) between a position to engage the first transmission shaft (3) and a position to engage the third transmission shaft (6), and a fourth clutch (14) adapted to switch a freely rotatable gear (G6) between a position to engage the second transmission shaft (4) and a position to engage the fourth transmission shaft (7).

10 Claims, 15 Drawing Figures

CLUTCH TYPE CHANGE SPEED APPARATUS FOR WORKING VEHICLE

BACKGROUND OF THE INVENTION

This invention relates to an improvement in a clutch type change speed apparatus used in a working vehicle such as an agricultural vehicle or tractor.

A known clutch type change speed apparatus of this type comprises four sets of constant mesh gear mechanisms provided for free rotation between a first transmission shaft and a second transmission shaft and having different reduction ratios, and hydraulically operable clutches between free rotation gears of the gear mechanisms and the transmission shafts supporting the free rotation gears, respectively. The clutches are selectively operable to provide four speeds through the gear mechanisms. (See Japanese Patent Application No. 59-186060, for example.)

Since in the above example simply the four gear mechanisms having different reduction ratios are provided between the first transmission shaft and the second transmission shaft to obtain the four speeds, the construction requires the four gear mechanisms which means the number of parts is correspondingly large and a large part of space in a transmission case is occupied by the gear mechanisms.

SUMMARY OF THE INVENTION

The object of this invention is to provide a compact change speed apparatus by rationally selecting reduction ratios of the gear mechanisms and thereby reducing the number of parts and hence the space occupied by the gear mechanisms, which results in a compact transmission case.

In order to achieve the above object, a clutch type change speed apparatus for a working vehicle according to this invention comprises a first transmission shaft acting as an input shaft, a second transmission shaft, a second clutch operatively interconnecting the first transmission shaft and the second transmission shaft, a third transmission shaft, a fourth transmission shaft acting as an output shaft, a third clutch operatively interconnecting the third shaft and the fourth transmission shaft, a first gear mechanism provided between the first transmission shaft and the third transmission shaft, a second gear mechanism provided between the second transmission shaft and the third transmission shaft, a third gear mechanism provided between the second transmission shaft and the fourth transmission shaft, the first to third gear mechanisms being the constant mesh type and having different reduction ratios, a first clutch adapted to switch a freely rotatable gear of the first gear mechanism between a position to engage the first transmission shaft and a position to engage the third transmission shaft, and a fourth clutch adapted to switch a freely rotatable gear between a position to engage the second transmission shaft and a position to engage the fourth transmission shaft, whereby the clutches are operable to produce a first speed state in which all the gear mechanisms are incorporated into a transmission line and which is realized by engaging the first clutch and the fourth clutch and disengaging the second clutch and the third clutch, and second, third and fourth speed states in which the gear mechanisms are selectively incorporated into the transmission line. In short, three gear mechanisms are provided between four transmission shafts and a four step speed changing is realized by selectively operating clutches disposed at suitable positions.

The invention is characterized by the three gear mechanisms having the respective reduction ratios rationally determined so that a combination of the three reduction ratios produces a fourth reduction ratio, and by the four clutches operable in an effectively combined manner. This arrangement provides the four speeds as illustrated in FIGS. 2 to 5 of the accompanying drawings. More particularly, the gear mechanisms 10, 11 and 12 are selectively actuated to produce a second speed state, a third speed state or a fourth speed state, the second speed state being realized by engaging the second clutch 8 and the fourth clutch 14 to incorporate the third gear mechanism 12 into a transmission line, the third speed state being realized by engaging the first clutch 13 and the third clutch 9 to incorporate the first gear mechanism 10 into the transmission line, and the fourth speed state being realized by engaging the second clutch 8 and the third clutch 9 to incorporate the second gear mechanism 11 into the transmission line. Further, a first speed state is realized by engaging the first clutch 13 and the fourth clutch 14 to incorporate all of the gear mechanisms 10, 11 and 12 into the transmission line.

Therefore, compared with the prior art construction, the invention successfully reduces the number of gear mechanisms without increasing the clutches, and the reduction in the number of gear mechanisms correspondingly reduces the space thereby occupied which results in a compact transmission case. Considering the case of providing the gear mechanisms between the first shaft and the second shaft as in the prior art, a distance between the shafts may be determined with the greater ease at the designing stage because of the reduced number of gear mechanisms. Since the gear mechanisms required in this invention provide small reduction ratios corresponding to the second to fourth speeds, these gear mechanisms may include smaller gears than a large diameter gear for providing the first speed. This permits a distance between adjacent transmission shafts (the first shaft and a third shaft, for example) to be smaller and thereby helps toward compactness of the transmission case.

Other advantages of this invention will be apparent from the following description.

BRIEF DESCRIPTION OF THE DRAWINGS

The drawings illustrate clutch type change speed apparatus for a working vehicle according to this invention, in which.

DESCRIPTION OF THE PREFERRED EMBODIMENTS

Figure 1:
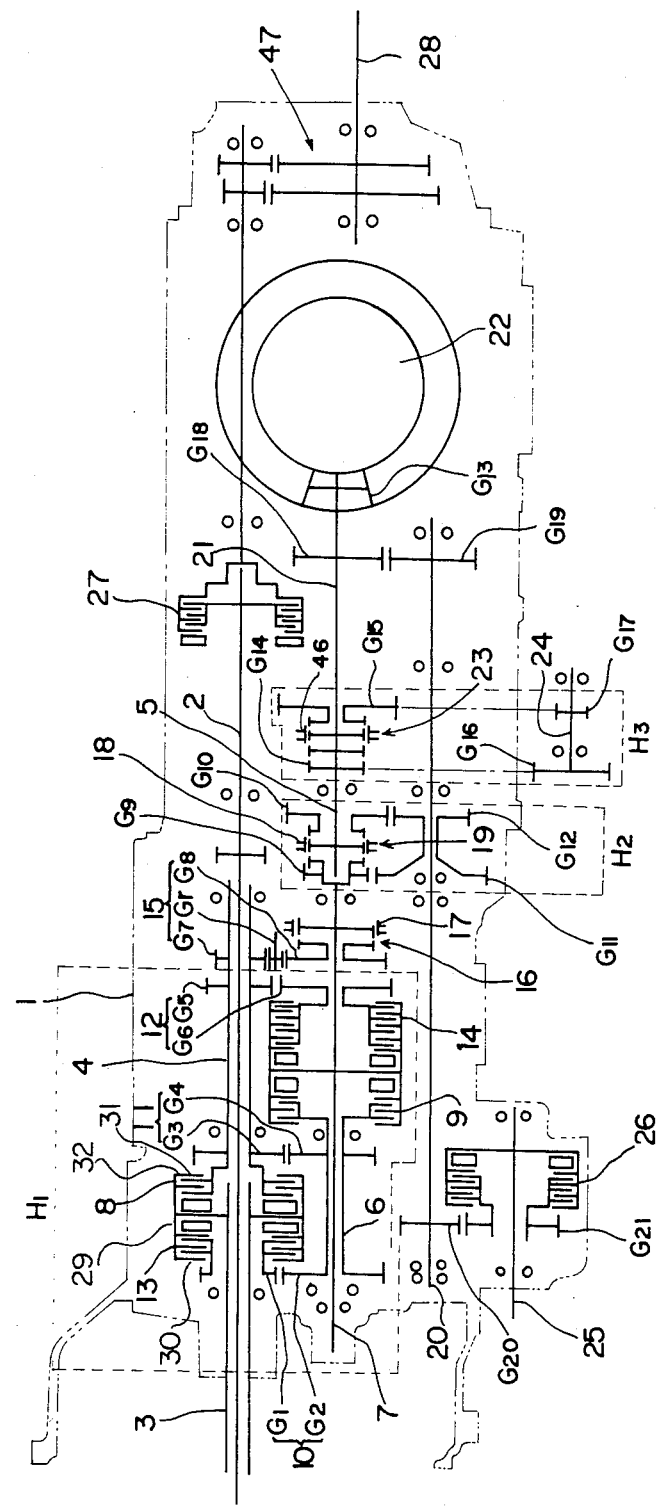
FIG. 1 is a schematic overall view of the apparatus.

The invention will be described further taking a change speed apparatus mounted in an agricultural tractor for example. A transmission case 1 houses a power takeoff transmission shaft 2 extending to a rear end thereof, a first transmission shaft 3 freely rotatably mounted on the power takeoff transmission shaft 2 to act as an input shaft of a propelling drive line, and a second transmission shaft 4 rotatably mounted on the power takeoff transmission shaft 2 rearwardly of the first transmission shaft 3. The transmission case 1 further houses a third transmission shaft 6 freely rotatably mounted on a fourth transmission shaft 7 parallel with the power takeoff transmission shaft 2. The third transmission shaft 6 has a length extending to an approximately mid-position axially of the fourth transmission shaft 7 and forms part of the propelling drive line. The first transmission shaft 3 and the second transmission shaft 4 are operatively connected to each other by a hydraulically operable multidisk type second clutch 8, and the third transmission shaft 6 and the fourth transmission shaft 7 are operatively connected to each other by a hydraulically operable multidisk type third clutch 9. A constant mesh type first gear mechanism 10 is provided between the first transmission shaft 3 and the third transmission shaft 6, which mechanism 10 comprises a first gear G1 freely rotatably mounted on the first transmission shaft 3 and a second gear G2 relatively unrotatably fitted on the third transmission shaft 6. A constant mesh type second gear mechanism 11 is provided between the second transmission shaft 4 and the third transmission shaft 6, which mechanism 11 comprises a third gear G3 relatively unrotatably fitted on the second transmission shaft 4 and a fourth gear G4 relatively unrotatably fitted on the third transmission shaft 4. A constant mesh type third gear mechanism 12 is provided between the second transmission shaft 4 and the fourth transmission shaft 7, which mechanism 12 comprises a fifth gear G5 relatively unrotatably fitted on the second transmission shaft 4 and a sixth gear G6 freely rotatably mounted on the fourth transmission shaft 7. The first to third gear mechanisms 10–12 have different reduction ratios. The first gear G1 is adapted for operative connection to the first transmission shaft 3 by means of a hydraulically operable multidisk type first clutch 13. The sixth gear G6 is adapted for operative connection to the fourth transmission shaft 7 by means of a hydraulically operable multidisk type fourth clutch 14. The first to fourth clutches 8, 9, 13 and 14 and first to third gear mechanisms 10–12 constitute a main change speed mechanism H1 adapted to provide four speeds.

A backward drive gear mechanism 15 is provided between the second transmission shaft 4 and the fourth transmission shaft 7 and adjacent the third gear mechanism 12. The backward drive gear mechanism 15 includes a seventh gear G7 relatively unrotatably fitted on the second transmission shaft 4, an eighth gear G8 freely rotatably mounted on the fourth transmission shaft 7, an idle gear Gr in mesh with the seventh gear G7 and the eighth gear G8, and a mechanically operable backward drive clutch 16 provided between the fourth transmission shaft 7 and the eighth gear G8. Power transmission from the second transmission shaft 4 to the fourth transmission shaft 7 is established by bringing a clutch sleeve 17 of the clutch 16 into engagement with the eighth gear G8.

An intermediate transmission shaft 5 is mounted coaxially and relatively rotatably with the fourth transmission shaft 7, the intermediate transmission shaft 5 having a forward end fitted in a rear end of the fourth transmission shaft 7 which defines a ninth gear G9 integral therewith. A mechanically operable clutch 19 having a clutch sleeve 18 is provided between the ninth gear G9 and a tenth gear G10 freely rotatably mounted on the intermediate transmission shaft 5. A front wheel drive transmission shaft 20 is mounted parallel to the intermediate transmission shaft 5 and carrying an eleventh gear G11 freely rotatably mounted thereon. The eleventh gear G11 includes a boss on which a twelfth gear G12 is fitted to be rotatable in unison therewith. The eleventh gear G11 is in constant mesh with the ninth gear G9, and the twelfth gear G12 is in constant mesh with the tenth gear G10. Thus, direct power transmission from the fourth transmission shaft 7 to the intermediate transmission shaft 5 is established by bringing the clutch sleeve 18 into engagement with the ninth gear G9, while power transmission to the intermediate transmission shaft 5 is effected through the tenth, eleventh and twelfth gears G10–G12 when the clutch sleeve 18 is brought into engagement with the tenth gear G10. These elements constitute an auxiliary change speed mechanism H2 adapted to provide two speeds.

A final output shaft 21 is mounted coaxially and relatively rotatably with the intermediate transmission shaft 5, the final output shaft 21 having a forward end fitted in a rear end of the intermediate transmission shaft 5 and a rear end defining an output gear G13 integral therewith to provide power for a rear differential mechanism 22. A clutch 23 having a clutch sleeve 46 is provided between a fourteenth gear G14 integral with the rear end of the intermediate transmission shaft 5 and a fifteenth gear G15 freely rotatably mounted on the final output shaft 21. An auxiliary shaft 24 is provided having a sixteenth gear G16 and a seventeenth gear G17 rigidly fixed thereto to be in constant mesh with the fourteenth gear G14 and the fifteenth gear G15, respectively. Thus, direct power transmission from the intermediate transmission shaft 5 to the final output shaft 21 is established by bringing the clutch sleeve 46 into engagement with the intermediate transmission shaft 5, while power transmission to the final output shaft 21 is effected through the fifteenth, sixteenth and seventeenth gears G15–G17 when the clutch sleeve 46 is brought into engagement with the fifteenth gear G15. These elements constitute a super reduction mechanism H3 adapted to provide two, high and low speeds.

The final transmission shaft 21 and the front wheel drive transmission shaft 20 carry an eighteenth gear G18 and a nineteenth gear G19 relatively unrotatably fitted on rear ends thereof, respectively, to form part of a front wheel drive line. A front wheel drive output shaft 25 is mounted parallel to a forward portion of the front wheel drive transmission shaft 20. The front wheel drive transmission shaft 20 carries a twentieth gear G20 relatively unrotatably fitted on the forward portion thereof, and the front wheel drive output shaft 25 carries a twentyfirst gear G21 freely rotatably mounted thereon and in constant mesh with the twentieth gear G20. A hydraulically operable multidisk type fifth clutch 26 is provided between the twentyfirst gear G21 and the front wheel drive output shaft 25. Thus, the tractor is adapted to travel in the four wheel drive mode by engaging the fifth clutch 26.

The power takeoff transmission shaft 2 extends through a position above the differential mechanism 22 to the rear of the transmission case 1 and includes a hydraulically operable multidisk type sixth clutch 27 at an intermediate position thereof. The clutch 27 is operable to establish or break power transmission to a power takeoff shaft 28 operatively connected to the power takeoff transmission shaft 2 through a transmission gear mechanism 47.

Clutches (not shown) are mounted at forward ends of the power takeoff transmission shaft 22 and the first transmission shaft 3, respectively, to establish or break power transmission through the power takeoff drive line and the propelling drive line.

Details of the main change speed mechanism H1 are as follows. The hydraulically operable first and second clutches 13 and 8 comprise an actuator 29 fitted on the first transmission shaft 3 to be rotatable in unison therewith and containing pistons 13a and 8a of the respective clutches. Friction disks 30 of the first clutch are mounted between a driven member of the first clutch acting also as first gear G1 and the actuator 29, and friction disks 32 of the second clutch are mounted between the actuator 29 and a driven member 31 fixed to the second transmission shaft 4. Thus, the first and second clutches are engageable by actuating the pistons 13a and 8a by means of oil supplied through an oil passage a extending through the first transmission shaft 3. Similarly, the hydraulically operable third and fourth clutches 9 and 14 comprise an actuator 33 fitted on the fourth transmission shaft 7 to be rotatable in unison therewith and containing pistons 9a and 14a of the respective clutches. Friction disks 35 of the third clutch are mounted between a driven member 34 fixed to the third transmission shaft to be rotatable in unison therewith and actuator 33, and friction disks 36 of the fourth clutch are mounted between the actuator 33 and a driven member acting also as the fourth gear G4. Thus, the thired and fourth clutches are engageable by actuating the pistons 9a and 14a by means of oil supplied through an oil passage b extending through the fourth transmission shaft 7.

Figure 8:
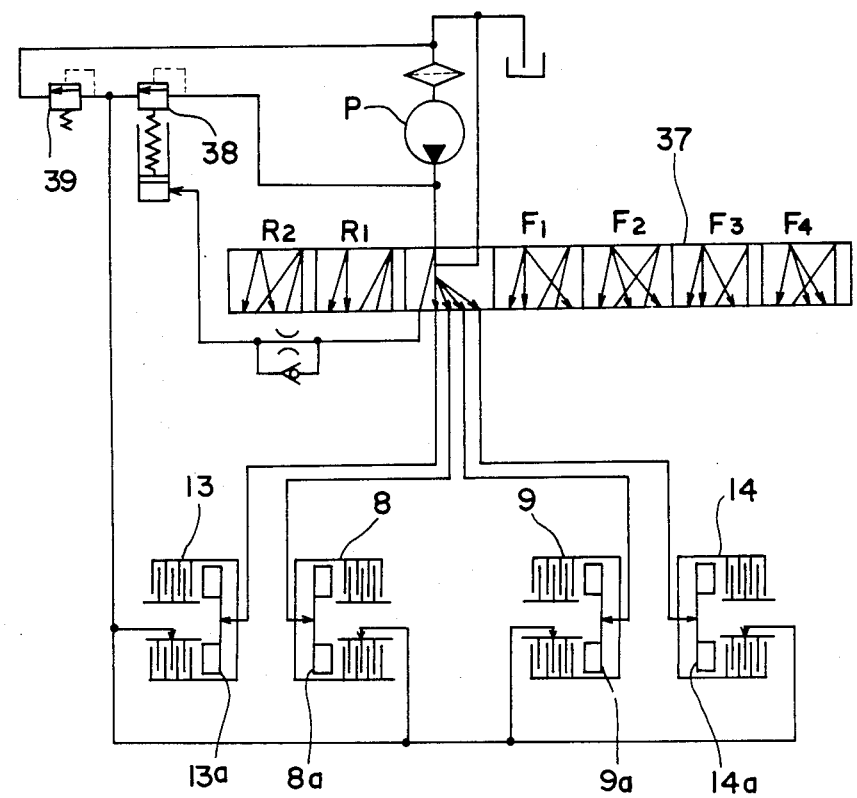
FIG. 8 is a view of a hydraulic circuit.

FIG. 8 shows a hydraulic circuit for controlling the first to fourth clutches 13, 8, 9 and 14. Oil chambers having the respective pistons 13a, 8a, 9a and 14a are adapted to receive oil from a pump P through a rotary valve 37. A modulating relief valve 39 is mounted on an oil line branched from an oil line between the pump P and the rotary valve 37 to control rising characteristics of a clutch actuating oil pressure. A low pressure relief valve 39 is provided downstream of the modulating relief valve 38. An oil line extends from a position upstream of the relief valve 39 to friction drive portions of all the clutches 13, 8, 9 and 14 to lubricate and cool friction surfaces thereof.

Figure 9:
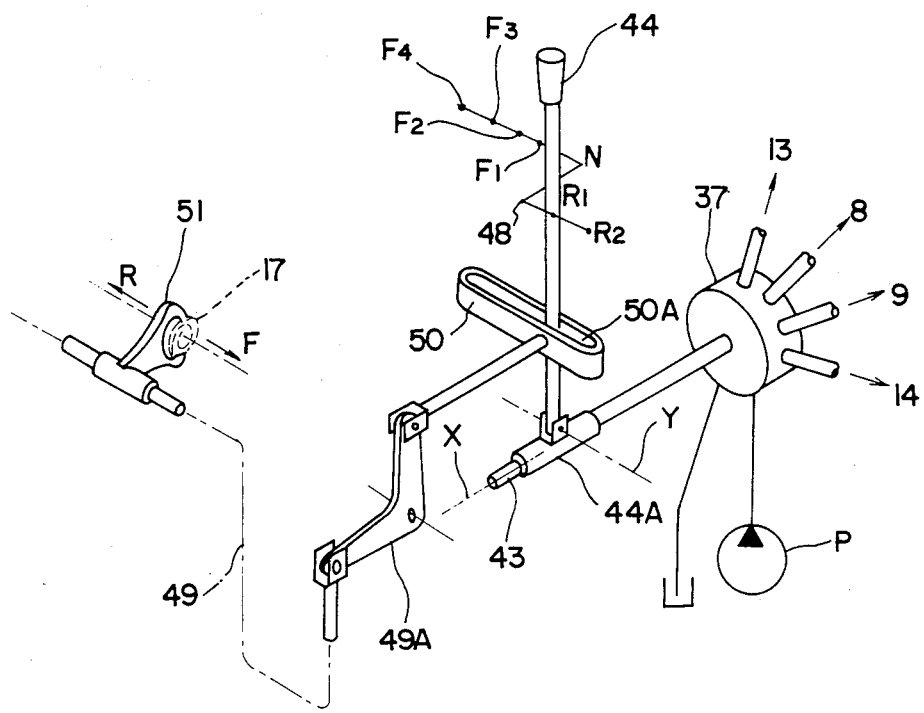
FIG. 9 is a perspective view of a change speed lever.
Figure 10:
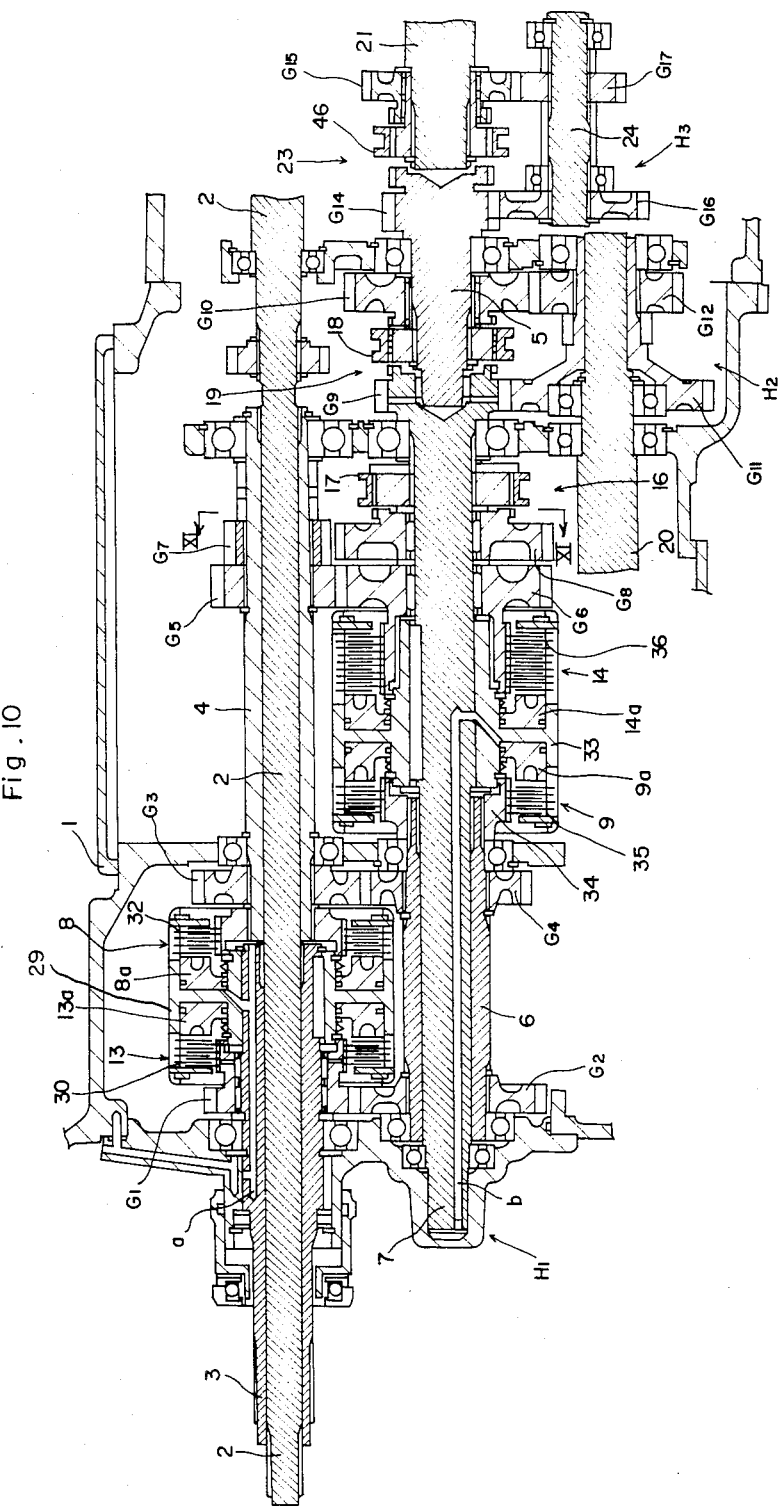
FIG. 10 is a side view of a main change speed mechanism.

Referring to FIG. 9, a main change speed lever 44 is supported at a base boss 44A by a transverse rod 43 to be pivotable about an axis X of the rod 43. The lever 44 is also pivotable about an axis Y perpendicular to the axis X. The transverse rod 43 is rigidly connected at an end thereof to a rotary spool of the rotary valve 37 to be rotatable in unison. By pivoting the main change speed lever 44 along a guide 48 about the axis X of the rod 43, main change speed operations and backward change speed operations to be described later may be effected. The following construction is employed to permit the main change speed lever 44 to control the backward traveling. The change speed lever 44 is operatively connected to an interlocking arm 50 defining a slot 50A to permit the change speed lever 44 to pivot for the change speed operations. The arm 50 is not movable when the change speed lever 44 is pivoted for the change speed operations, but is movable axially of the transverse rod 43 when the change speed lever 44 is pivoted in neutral position about the axis Y. The interlocking arm 50 is operatively connected through a link mechanism 49 including a bellcrank 49A to a shift fork 51 in engagement with the backward drive clutch sleeve 17. When the change speed lever 44 is pivoted in neutral position relative to the base boss 44A, the clutch sleeve 17 is disengaged from the eighth gear G8.

Thus, the four forward speeds are provided by pivoting the main change speed lever 44 about the axis X of the rod 43 and, for switching to the backward drive, the lever 44 is first pivoted in neutral position and in a direction perpendicular to the direction in which the lever 44 is pivoted for the forward change speed operations, and then the backward change speed operation is effected.

Positions of the main change speed mechanism H1 resulting from the operation of the change speed lever 44 will be described hereinafter with reference to FIGS. 2 to 8.

Figure 2:
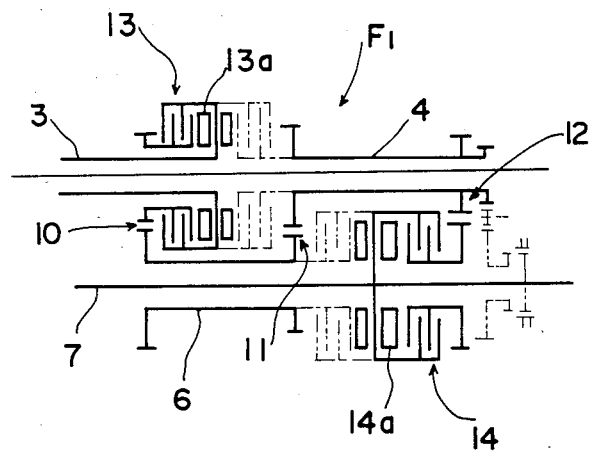
FIG. 2 is a schematic view showing a position to provide a first forward speed.

FIG. 2 shows a state in which a first forward speed F1 is provided. When the change speed lever 44 is moved to a position to provide the first forward speed, the pressure oil is supplied from the pump P to the oil chambers having the pistons 13a and 14a of the first and fourth clutches 13 and 14. This produces the first forward speed F1 by causing the power input to the first transmission shaft 3 to be transmitted to the fourth transmission shaft 7 through the first gear mechanism 10, the third transmission shaft 6, the second gear mechanism 11, the second transmission shaft 4, and the third gear mechanism 12. The power is then transmitted from the fourth transmission shaft 7 thrugh the auxiliary change speed mechanism H2 and the super reduction mechanism H3 to the rear differential mechanism 22.

Figure 3:
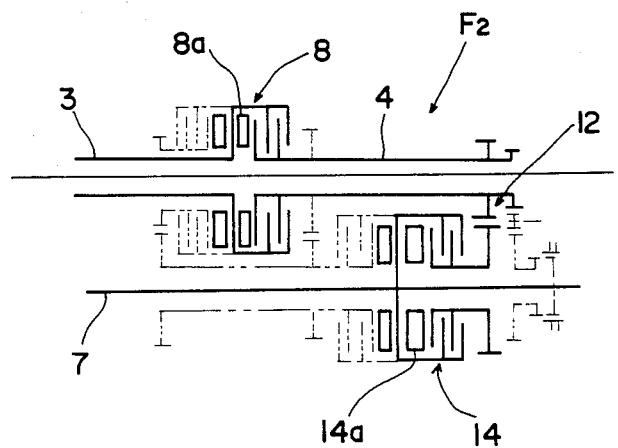
FIG. 3 is a schematic view showing a position to provide a second forward speed.

FIG. 3 shows a state in which a second forward speed F2 is provided. When the change speed lever 44 is moved to a position to provide the second forward speed F2, the second and fourth clutches 8 and 14 assume engaged positions. This produces the second forward speed by causing the power input to the first transmission shaft 3 to be transmitted through the second transmission shaft 4 and the third gear mechanism 12 to the fourth transmission shaft 7.

Figure 4:
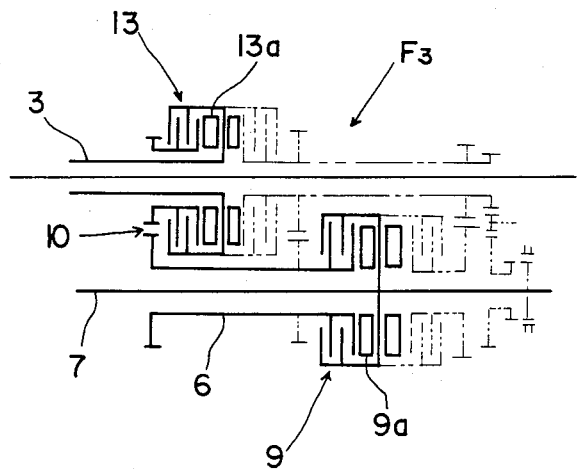
FIG. 4 is a schematic view showing a position to provide a third forward speed.

FIG. 4 shows a state in which a third forward speed F3 is provided. When the change speed lever 44 is moved to a position to provide the third forward speed F3, the first and third clutches 13 and 9 assume engaged positions. This produces the third forward speed by causing the power input to the first transmission shaft 3 to be transmitted through the first gear mechanism 10 and the third transmission shaft 6 to the fourth transmission shaft 7.

Figure 5:
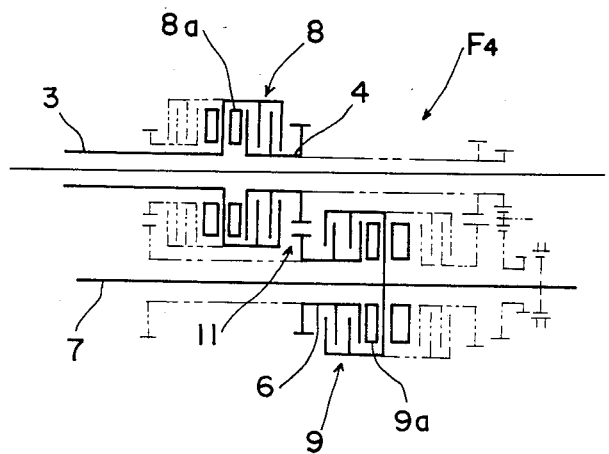
FIG. 5 is a schematic view showing a position to provide a fourth forward speed.

FIG. 5 shows a state in which a fourth forward speed F4 is provided. When the change speed lever 44 is moved to a position to provide the fourth forward speed F4, the second and third clutches 8 and 9 assume engaged positions. This produces the fourth forward speed by causing the power input to the first transmission shaft 3 to be transmitted through the second transmission shaft 4, the second gear mechanism 11 and the third transmission shaft 6 to the fourth transmission shaft 7.

Figure 6:
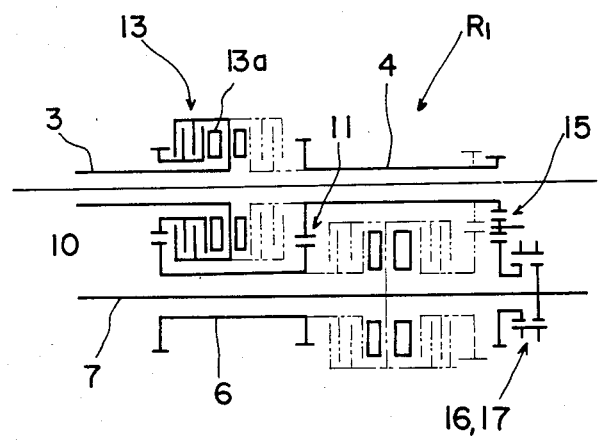
FIG. 6 is a schematic view showing a position to provide a first backward speed.

FIG. 6 shows a state in which a first backward speed R1 is provided. When the change speed lever 44 is pivoted in neutral position about the axis Y and thereafter is pivoted to a position to provide the first backward speed R1, only the first clutch 13 assumes the engaged position. This produces the first backward speed R1 by causing the power input to the first transmission shaft 3 to be transmitted to the fourth transmission shaft 7 through the first gear mechanism 10, the third transmission shaft 6, the second gear mechanism 11, the second transmission shaft 4 and the backward drive gear mechanism 15.

Figure 7:
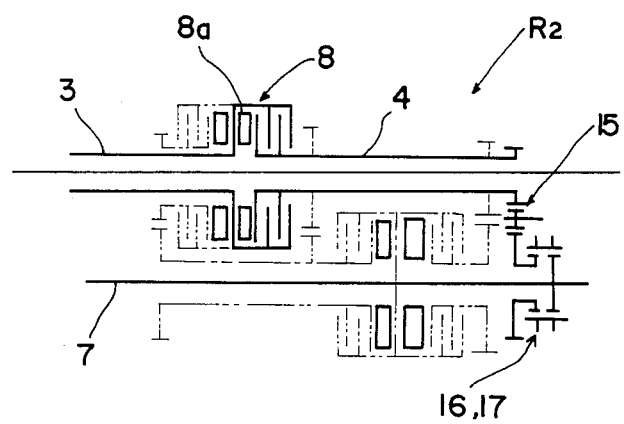
FIG. 7 is a schematic view showing a position to provide a second backward speed.

FIG. 7 shows a state in which a second backward speed R2 is provided. When the change speed lever 44 is pivoted further from the position to provide the first backward speed R1 to a position to provide the second backward speed R2, only the second clutch 8 assumes the engaged position. This produces the second backward speed R2 by causing the power input to the first transmission shaft 3 to be transmitted to the fourth transmission shaft 7 through the second clutch 8, the second transmission shaft 4 and the backward drive gear mechanism 15.

The described construction is adapted to provide a total of sixteen forward speeds and eight backward speeds, with the main change speed mechanism H1 providing the four forward speeds and two backward speeds, the auxiliary change speed mechanism H2 providing the two, high and low speeds, and the super reduction mechanism H3 providing the two, high and low speeds.

Figure 11:
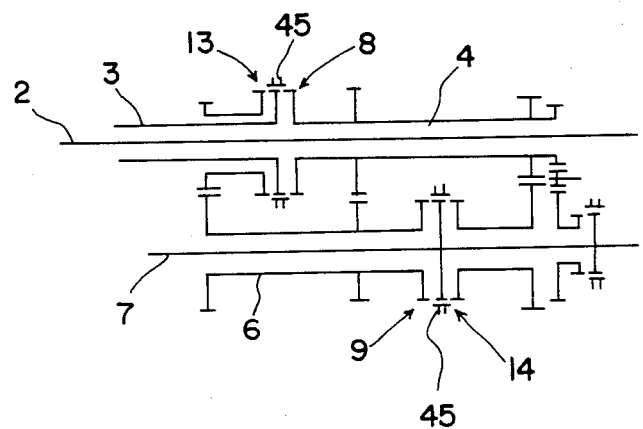
FIG. 11 is a schematic view of a modified main change speed mechanism.

As shown in FIG. 11, the hydraulically operable multidisk type clutches 13, 8, 9 and 14 may be replaced by mechanically operable clutches having clutch sleeves 45.

Figure 12:
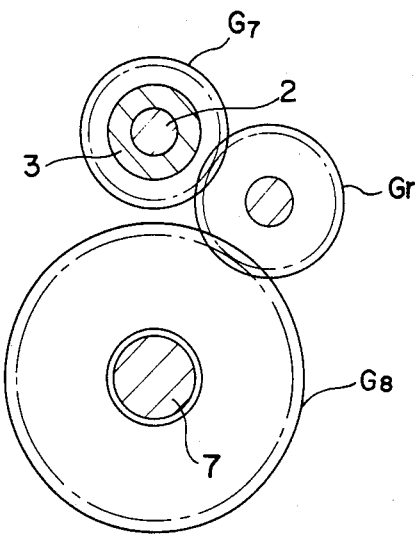
FIG. 12 is a sectional view taken on line XI—XI of FIG. 10.
Figure 15:
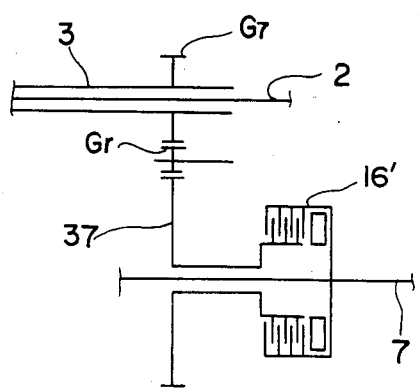
FIG. 15 is a schematic view of a hydraulically operable backward drive clutch.

FIGS. 12 and 15 schematically show a positional relationship between the first to fourth clutches 13, 8, 9 and 14 and the backward drive gear mechanism 15.

Figure 13:
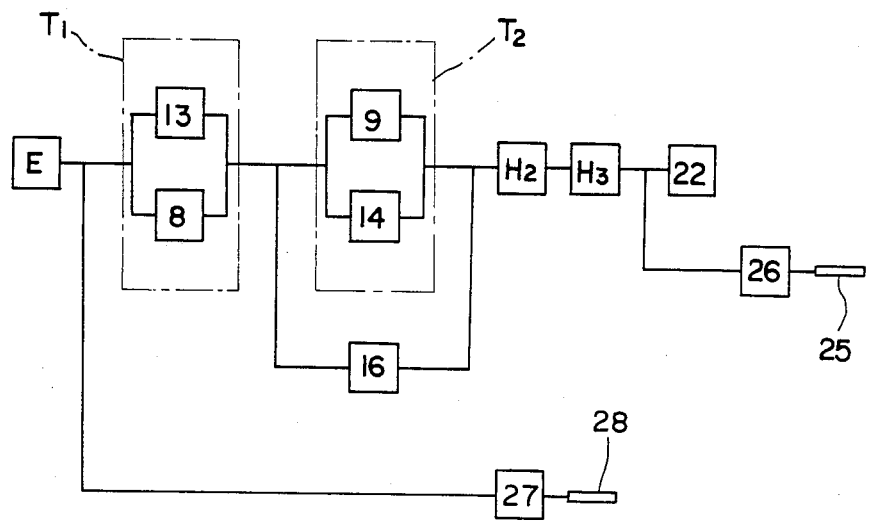
FIG. 13 is a block diagram showing clutch positions.

Referring to FIG. 13, a first change speed section T1 adapted to provide two speeds and a second change speed section T2 adapted to provide two speeds are serially interconnected so as to provide the four forward speeds in combination. The second change speed section T2 is operable to break power transmission, and the backward drive clutch 16 is connected in series to the first change speed section T1 and in parallel with the second change speed section T2. Thus the backward drive clutch 16 is adatped to receive the power from the first change speed section T1 and transmit the power to a position downstream of the second change speed section T2.

According to the position of the clutch as described above, a forward drive is provided through the first and second change speed sections T1 and T2 by placing the second change speed section T2 in a position to transmit the power and disengaging the backward drive clutch 16. A backward drive is provided through the first change speed section T1 and the backward drive clutch 16 bypassing the second change speed section T2 by placing the second change speed section T2 in a position to break the power transmission and engaging the clutch 16, the backward drive speed being changeable by switching the first change speed section T1. In other words, a forward drive clutch is unnecessary since the backward drive clutch 16 alone is sufficient for switching between the backward drive and the forward drive and the first change speed section T1 acts to change the backward drive speeds. Consequently, the described construction has the advantage of structural simplicity and low cost in that only one clutch for the backward and forward drive switching is required.

Figure 14:
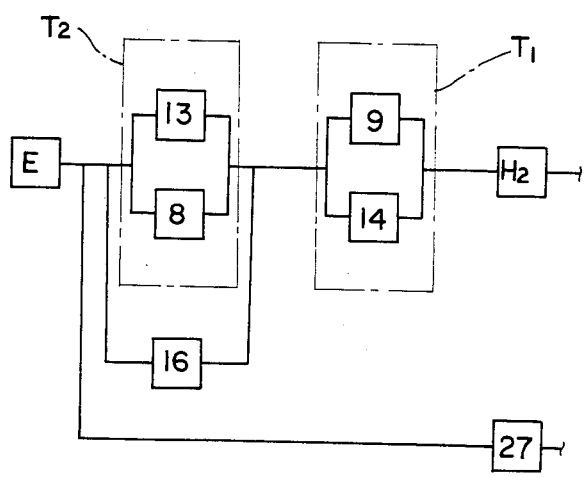
FIG. 14 is a block diagram showing modified clutch positions.

FIG. 14 shows a modified arrangement in which the second change speed section T2 is disposed upstream of the first change speed section T1 and the backward drive clutch 16 receives the power of an engine E and transmits the power to the first change speed section T1 bypassing the second change speed section T2.

As shown in FIG. 15, the backward drive clutch 16 may comprise a hydraulic clutch 16' operable to establish or break a connection between the ninth gear 37 and the output shaft 7.

The described change speed apparatus may be mounted on other types of working vehicle such as a transportation vehicle.

I claim:

1. A clutch type change speed apparatus for a working vehicle comprising:
   a first transmission shaft (3) acting as in input shaft,
   a second transmission shaft (4) connectable to said first transmission shaft (3),
   a fourth transmission shaft (7) acting as an output shaft,
   a third transmission shaft (6) connectable to said fourth transmission shaft (7),
   a first gear mechanism (10) connected to said third transmission shaft (6),
   a second gear mechanism (11) disposed between said second transmission shaft (4) and said third transmission shaft (6),
   a third gear mechanism (12) connected to said second transmission shaft (4),
   a first clutch (13) for connecting said first transmission shaft (3) to said first gear mechanism (10),
   a second clutch (8) for connecting said first transmission shaft (3) to said second transmission shaft (4),
   a third clutch (9) for connecting said third transmission shaft (6) to said fourth transmission shaft (7), and
   a fourth clutch (14) for connecting said fourth transmission shaft (7) to said third gear mechanism (12),
   wherein a first speed (F1) is produced by interconnecting said first transmission shaft (3), said first gear mechanism (10), said second gear mechanism (11), said second transmission shaft (4), said third gear mechanism (12) and said fourth transmission shaft (7),
   a second speed (F2) is produced by interconnecting said first transmission shaft (3), said second transmission shaft (4), said third gear mechanism (12) and said fourth transmission shaft (7),
   a third speed (F3) is produced by interconnecting said first transmission shaft (3), said first gear mechanism (10), said third transmission shaft (6) and said fourth transmission shaft (7), and
   a fourth speed (F4) is produced by interconnecting said first transmission shaft (3), said second gear mechanism (11), said third transmission shaft (6) and said fourth transmission shaft (7), whereby said four forward speeds are progressively obtained by use of said three gear mechanisms in one input drive range.

2. A clutch type change speed apparatus as claimed in claim 1 wherein the first to fourth clutches (13, 8, 9, 14) comprise hydraulically operable clutches including pistons (13a, 8a, 9a, 14a), respectively.

3. A clutch type change speed apparatus as claimed in claim 2 further comprising a hydraulic pump (P) for supplying pressure oil to the first to fourth clutches (13, 8, 9, 14), a rotary valve (37) for controlling the pressure oil supplied by the hydraulic pump (P), and a modulating relief valve (38) connected to the hydraulic pump (P) in parallel with the rotary valve (37) for controlling rising characteristics of a clutch operating hydraulic pressure.

4. A clutch type change speed apparatus as claimed in claim 2 wherein the first clutch (13) and the second clutch (8) constitute a first change speed section (T1), and the third clutch (9) and the fourth clutch (14) constitute a second change speed section (T2), the first and second change speed sections being connected in series, and said apparatus further comprising a backward drive clutch (16) connected in series to the first change speed section (T1) and in parallel with the second change speed section (T2).

5. A clutch type change speed apparatus as claimed in claim 4 wherein the backward drive clutch (16) is adapted to transmit output of the first change speed section (T1) to a position downstream of the second change speed section (T2).

6. A clutch type change speed apparatus for a working vehicle comprising:
   a first transmission shaft (3) acting as an input shaft,
   a second transmission shaft (4) connectable to said first transmission shaft (3),
   a fourth transmission shaft (7) acting as an output shaft,
   a third transmission shaft (6) connectable to said fourth transmission shaft (7),
   a first gear mechanism (10) connected to said third transmission shaft (6),
   a second gear mechanism (11) disposed between said second transmission shaft (4) and said third transmission shaft (6),
   a third gear mechanism (12) connected to said second transmission shaft (4),
   a backward drive gear mechanism (15) connected to said second transmission shaft (4),
   a first clutch (13) for connecting said first transmission shaft (3) to said first gear mechanism (10),
   a second clutch (8) for connecting said first transmission shaft (3) to said second transmission shaft (4),
   a third clutch (9) for connecting said third transmission shaft (6) to said fourth transmission shaft (7),
   a fourth clutch (14) for connecting said fourth transmission shaft (7) to said third gear mechanism (12), and
   a backward drive clutch (16) for connecting said fourth transmission shaft (7) to said backward drive gear mechanism (15),
   wherein a first speed (F1) is produced by interconnecting said first transmission shaft (3), said first gear mechanism (10), said second gear mechanism (11), said second transmission shaft (4), said third gear mechanism (12) and said fourth transmission shaft (7),
   a second speed (F2) is produced by interconnecting said first transmission shaft (3), said second transmission shaft (4), said third gear mechanism (12) and said fourth transmission shaft (7),
   a third speed (F3) is produced by interconnecting said first transmission shaft (3), said first gear mechaniam (10), said third transmission shaft (6) and said fourth transmission shaft (7),
   a fourth speed (F4) is produced by interconnecting said first transmission shaft (3), said second gear mechanism (11), said third transmission shaft (6) and said fourth transmission shaft (7),
   a first backward speed is produced by interconnecting said first transmission shaft (3), said first gear mechanism (10), said second gear mechanism (11), said second transmission shaft (4), said backward drive gear mechanism (15) and said fourth transmission shaft (7), and
   a second backward speed is produced by interconnecting said first transmission shaft (3), said second transmission shaft (4), said backward drive gear mechanism (15) and said fourth transmission shaft (7), whereby said four forward speeds are progressively obtained by use of said three gear mechanisms in one input drive range.

7. A clutch type change speed apparatus as claimed in claim 6 wherein the first to fourth clutches (13, 8, 9, 14) comprise hydraulically operable clutches including pistons (13a, 8a, 9a, 14a), respectively.

8. A clutch type change speed apparatus as claimed in claim 7 further comprising a hydraulic pump (P) for supplying pressure oil to the first to fourth clutches (13, 8, 9, 14), a rotary valve (37) for controlling the pressure oil supplied by the hydraulic pump (P), and a modulating relief valve (38) connected to the hydraulic pump (P) in parallel with the rotary pump (37) for controlling rising characteristics of a clutch operating hydraulic pressure.

9. A clutch type change speed apparatus as claimed in claim 6 wherein the first clutch (13) and the second clutch (8) constitute a first change speed section (T1), and the third clutch (9) and the fourth clutch (14) constitute a second change speed section (T2), the first and second change speed sections being connected in series, and said backward drive clutch is connected in series to said first change speed section (T1) and in parallel with said second change speed section (T2).

10. A clutch type change speed apparatus as claimed in claim 9 wherein said backward drive clutch (16) is adapted to transmit output of the first change speed section (T1) to a position downstream of the second change speed section (T2).

* * * * *